United States Patent [19]
Malecki et al.

[11] Patent Number: 6,076,671
[45] Date of Patent: Jun. 20, 2000

[54] SOLID PARTICLE AEROSOL BELT AND DISSEMINATION METHOD

[75] Inventors: Raymond J. Malecki, Perryhall; William G. Rouse, Havre De Grace, both of Md.; Michael J. Orr, Orlando, Fla.; Daniel J. Hartman, Orlando, Fla.; Samuel Morgan, Orlando, Fla.

[73] Assignee: The United States of America as represented by the Secretary of the Army, Washington, D.C.

[21] Appl. No.: 09/045,967

[22] Filed: Mar. 18, 1998

[51] Int. Cl.⁷ .................................................... B65D 85/28
[52] U.S. Cl. ............................................. 206/383; 239/654
[58] Field of Search ............................... 206/383, 63, 37, 206/390, 820, 226; 239/654; 356/28; 149/108.2; 229/53

[56] References Cited

U.S. PATENT DOCUMENTS

| | | | |
|---|---|---|---|
| 2,187,376 | 1/1940 | Guibert | 239/654 X |
| 2,669,271 | 2/1954 | Treckmann | 239/654 X |
| 3,542,250 | 11/1970 | McRitchie | 239/654 |
| 4,344,557 | 8/1982 | Lerner | 229/53 |
| 4,752,002 | 6/1988 | Takahashi et al. | 206/204 |
| 4,852,809 | 8/1989 | Davis et al. | 239/654 |
| 4,860,899 | 8/1989 | McKee | 206/534 |
| 5,652,652 | 7/1997 | Jones et al. | 356/28 |
| 5,656,794 | 8/1997 | Krone et al. | 149/108.2 |

*Primary Examiner*—Kevin Weldon
*Attorney, Agent, or Firm*—Vincent J. Ranucci; Ulysses John Biffoni

[57] ABSTRACT

A particulate aerosol dissemination device comprising a shreddable belt is disclosed. The belt has a plurality of individual cells aligned along the belt length and which extend across the belt width. The cells are separated by partitions extending between the cells across the belt width. The cells are capable of holding a solid aerosol filler comprising any one of the following: obscurant or smoke generating materials; pesticides; insecticides; fungicides; riot control agents; fertilizer; and feed. A method for disseminating a solid particle aerosol using the belt and a process for manufacturing the aerosol belt segments is also disclosed.

25 Claims, 2 Drawing Sheets

6,076,671

SOLID PARTICLE AEROSOL BELT AND DISSEMINATION METHOD

GOVERNMENT INTEREST

The invention described herein may be manufactured, licensed, and used by or for the U.S. Government.

BACKGROUND OF THE INVENTION

1. Field of the Invention

The present invention relates to a solid particle aerosol device and method for aerosol dispersal. More particularly, the device and method provide easy handling and dissemination of the solid particle aerosol material. Most particularly, the device and method permit the rapid and efficient dissemination of solid particle aerosol into the atmosphere for military and civilian purposes.

2. Brief Description of the Related Art

Aerosols are the suspension of solid particles in the atmosphere. Aerosols are used in the military to defensively position and protect combat forces. In civilian use, aerosol dispersal is used by police for riot control and by farmers for agricultural purposes. These solid particle payloads have included smokes, obscurants, riot control agents, insecticides, pesticides, fungicides, fertilizer, feed and other similar compounds.

The military has used a multitude of devices ranging from pneumatic spray tanks to high explosive (HE) grenades to disperse a variety of solid particle payloads into the atmosphere. During military operations, a military force may be targeted by visual means, ultraviolet, infrared (IR), and millimeter (MM) radar sensors. In countering this targeting, various types of filler payloads are used for aerosol dissemination. These payloads include carbon fiber payloads to block energy in the MM region of the electromagnetic spectrum, smokes to obscure military forces from visual detection, and brass flakes or graphite flakes which interfere with IR tracking and target acquisition devices.

Current military IR dispersion techniques require that military personnel load IR material from bulk bag containers. Personnel physically remove the filler material from large bags and place the filler into a separate hopper for dispersion. Generally, the filler is dirty to handle. The particles also may create hazardous toxic atmospheric dust during the loading phase, presenting a health risk to the personnel handling the filler. Typically, the materials include fillers such as pelletized graphite shipped in 30 pound bags, having a bulk density of 44 lb/ft$^3$ to 55 lb/ft$^3$ (0.7 g/ml to 0.8 g/ml).

In civilian use, aerosols are dispersed by police as a non-lethal means for crowd dispersal, riot control, personal protectants and/or incapacitating agents. Additionally, aerosols used for civilian commercial purposes include the dispersal of aerosols for agricultural uses, such as disseminating insecticides, pesticides, fertilizers or feed over a wide area. The dispersal of aerosol particles for both military and civilian use should have safe handling and activation characteristics.

In view of the foregoing, improvements in the dispersal of aerosols have been desired. In addition to improved safe handling, effective dissemination of aerosol particles is desired.

SUMMARY OF THE INVENTION

The present invention provides a particulate aerosol dissemination device comprising a shreddable belt defined by a length and width; a plurality of individual cells on the belt, being aligned along the belt length and which extend across or substantially across the belt width, the cells being separated by partitions extending between the cells across the belt width, the cells further being capable of holding an aerosol filler therein; and, a solid, particulate aerosol filler inside the cells. The aerosol filler may be selected from any number of materials depending upon the particular application. For example, obscurant or smoke generating materials, riot control agents, pesticides, insecticides, fungicides, fertilizer or feed may be used.

The invention also provides a method for disseminating a solid particle aerosol comprising the steps of providing a particulate aerosol dissemination device comprising a shreddable belt defined by a length and width, a plurality of individual cells on the belt, being aligned along the belt length and which extend across the belt width, the cells being separated by partitions extending between the cells across the belt width, the cells further being capable of holding an aerosol filler therein, and, a solid, particulate aerosol filler inside the cells; feeding said device holding the solid particulate aerosol filler into a dissemination apparatus; shredding said device holding the solid particulate aerosol filler within the dissemination apparatus; and, disseminating the shredded device and solid particulate aerosol filler into the atmosphere.

The invention further provides a process for manufacturing said aerosol belt device comprising the steps of providing a length of tubing having a zipper seal along or substantially near to an edge, heat sealing perpendicular to the length of tubing, wherein the perpendicular sealing forms cells along the length of the tubing; filling the formed cells with the a solid particulate aerosol filler; and, closing said zipper seal thereby forming cells, wherein the solid particulate aerosol filler is contained within the cells.

DETAILED DESCRIPTION OF THE PREFERRED EMBODIMENTS

The present invention is a solid particle aerosol device and a method for disseminating the solid particle aerosol from the device. The device and method of solid particle aerosol dispersal permit easy handling and dissemination of the solid particle aerosol in combat and non-combat operations. The device and method also provide rapid and efficient dispersal of solid particle aerosol into the atmosphere for military and civilian purposes.

Figure 1:
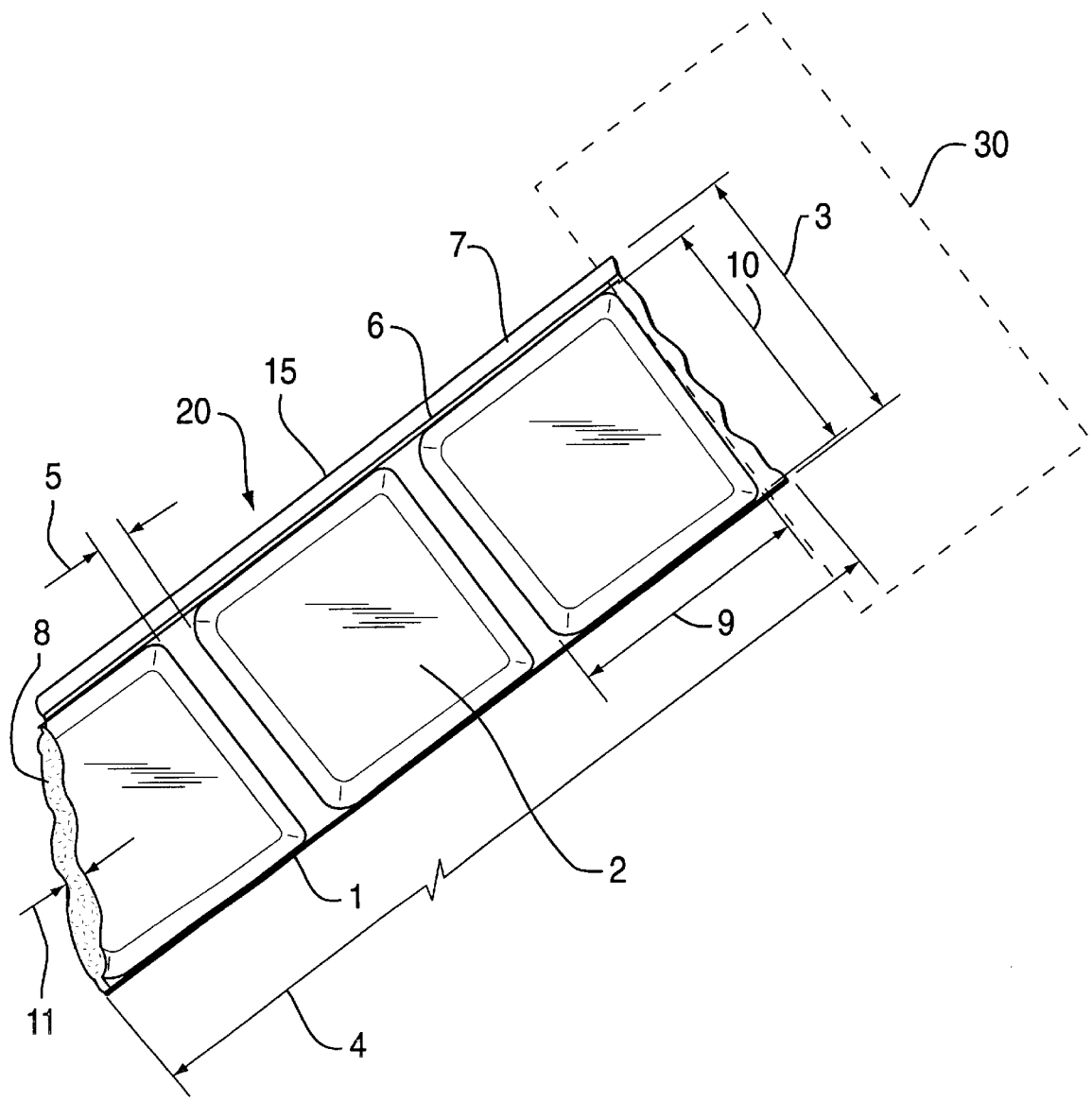
FIG. 1 illustrates the device of the present invention.

As seen in FIG. 1, the device 20 comprises a belt, or belt structure 1 having multiple individual packing cells 2 along a belt length 4. The belt 1 provides a means for the rapid supply of several cells 2 to be loaded into and dispersed from a dissemination apparatus 30. The width 3 and length 4 of the belt 1 are of such dimensions as to provide adjacent cells 2 along the belt length 4, and to hold the cells 2 within the width 3. The cells 2 are spaced apart by partitions 5, which extend across the belt width 3 between the cells 2. A zipper seal 6, which may extend along the belt length 4, is fixed between the cells 2 and a belt edge 15 on at least one side 7 of the belt 1. The cells 2 contain an aerosol filler 8, which is sealed inside of the cells 2. The aerosol filler 8 comprises any solid particles which are capable of forming an aerosol.

The dimensions of the belt 1 are limited by a cutter size in the dissemination apparatus 30. The cutter may be any mechanism which shreds the belt 1 holding the aerosol filler 8. This includes rotary chopping mechanisms. Generally, the belt length 4 may be any convenient continuous length. The belt width 3 permits the alignment of adjacent cells 2 along the belt length 4 in a single uniform row. The invention also contemplates attached parallel rows. Preferably the belt width 3 is from about 1 inch to about 4 inches, more preferably from about 3 inches to about 3.5 inches, and most preferably from about 2 inches to about 2.5 inches. Larger belts 1 may be used to handle more material with larger cell 2 sizes. Smaller belts 1 also may be used, if desired. The belt 1 is constructed of any material which allows the belt 1 to be shredded in the dissemination apparatus 30. Preferably, the belt 1 is a plastic or fabric construction, more preferably the belt 1 is plastic, and most preferably the belt 1 is polyethylene.

The belt 1 may be placed in a container or on a spool. When the belt 1 is packaged in a container, the belt width 3 is limited by the container width. Preferably, the belt 1 is layered in the container which is a rectangular box, more preferably the belt 1 is layered in a cardboard rectangular box. The belt 1 is easily accessed from the box, with the box conveniently placed inside a storage magazine as part of the dissemination apparatus 30 which allows the belt 1 to be loaded into the dissemination apparatus 30.

In comparison with the currently known filler loading, the present aerosol dissemination device may be contained in a box having rectangular dimensions of 10.50 inches in height, 21.00 inches in length, and 2.80 inches in width which is approximately 500 in$^3$ (8193.5 cm$^3$) and weighs approximately 19 pounds (8626 grams) when filled with a belt 1 having brass aerosol filler 8. With a weight of 8626 grams and a volume of 8193 cm$^3$, the bulk density of the box is 1.053 g/ml. This provides a 20% to 30% increase in bulk density over the currently used methods. Additionally, the aerosol filler 8 is enclosed which prevents the aerosol filler 8 from spreading into the handler's atmosphere, such as the inside of a combat vehicle or tank, thereby providing a cleaner and safer environment.

The cells 2 along the belt length 4 may be attached to the belt 1 or may form chambers within the belt 1 which are filled with a desired amount of aerosol filler 8. Preferably, the cells 2 form chambers within the belt 1. The size of the cells 2 may be varied depending on the capacity of the dissemination apparatus 30. The cells 2 are aligned along the belt length 4 and extend across or substantially across the belt width 3. Preferably, the cells 2 are from about 1 inch to about 5 inches in cell length 9 and from about 1 inch to about 5 inches in cell width 10, more preferably from about 1.75 inches to about 3.5 inches in cell length 9 and from about 1.75 inches to about 3.5 inches in cell width 10.

The cell length 9 and width 10 are such as to allow maximum cell thickness 11 while allowing the cells 2 and belt 1 to properly move through the dissemination apparatus 30. The thickness 11 of the cells 2 is such as to effectively disperse the aerosol filler 8 into the solid particle aerosol. Preferably, the cell thickness 11 is from about $\frac{3}{4}^{th}$ inch (0.75 inches) or less in thickness, more preferably from about $\frac{1}{2}$ inch (0.5 inches) to about $\frac{1}{16}^{th}$ inch (0.0625 inches) thickness, and most preferably from about $\frac{1}{2}$ inch (0.5 inches) to about $\frac{1}{8}^{th}$ inch (0.125 inches) thick.

Additionally, the cells 2 are fixed adjacent to each other along the belt length 4 and separated by partitions 5 to provide for rapid and consistent loading into the dissemination apparatus 30. The partitions 5 extend across the belt width 3 perpendicular to the belt length 4. Preferably, the partitions 5 provide an equal spacing between each of the cells 2 along the entire belt length 4. However, the partitions 5 also may be configured with means to allow for a starting and stopping of a continuous belt 1 after being cut within the dissemination apparatus 30 without loss of aerosol filler 8 from leakage from a cut belt 1. Preferably, the cells 2 are spaced from about 1 inch or less from each other, more preferably from about $\frac{1}{2}$ inch (0.5 inches) to about $\frac{3}{16}^{th}$ inch (0.1875 inches) from each other, and most preferably the partitions 5 between the cells 2 are from about $\frac{1}{8}^{th}$ inch (0.25 inches) to about $\frac{1}{4}$ inch, most preferably $\frac{3}{16}^{th}$ inch (0.1875 inches) in width.

The cells 2 of the device 20 are made of any material which permits the shredding and dispersal of the aerosol filler 8 into the atmosphere as an aerosol. Preferably, the cells 2 are made from the same materials as the belt 1, more preferably the cells 2 are a plastic material, and most preferably the cells 2 are polyethylene. This permits the aerosol filler 8 in the cells 2 to be heat sealed, providing an efficient construction process for cell 2 placement along the belt length 4. The individual cells 2 are separated from each other by partitions 5 of thin plastic walls which may be created by heat sealing along periodic segments across the belt width 3 perpendicular to the belt length 4.

The filler material or aerosol filler 8 of the cells 2 is any compound which may be used as the solid particle aerosol. The aerosol fillers 8 may be an obscurant, riot control agent, agricultural agent and the like. Obscurants include aerosol fillers 8 such as titanium dioxide, brass flakes, carbon flakes, carbon fibers, graphite flakes, chaff and the like. Brass flakes have a greater density than other IR screening materials, providing better maximum volume efficiency when packed into small cell units. Riot control agents include CS, Ortho-chlorobenzalmalononitrile and OC, N-((4-hydroxy-3-methoxyphenyl)methyl)-8-methyl-6-nonenamide, and similar compounds. Agricultural agents include pesticides, fertilizers, feed and the like. For military smoke generation applications, preferably the aerosol filler 8 comprises an obscurant, and more preferably the aerosol filler comprises an obscurant of brass flakes.

The zipper seal 6 along the belt edge 15 is used to contain a rapid and consistent supply of cells 2 filled with aerosol filler 8. The zipper seal 6 is fixed along at least one side 7 of the belt 1, between the cells 2 and the belt edge 15. The zipper seal 6 extends a length to permit the loading of aerosol filler 8 into the cells 2 of the belt 1. Preferably, the zipper seal 6 extends approximately the entire length of the belt 1. The zipper seal 6 comprises any connection, such as a Zyploc® connection, which is compatible with use for loading and sealing the cells 2.

Figure 2:
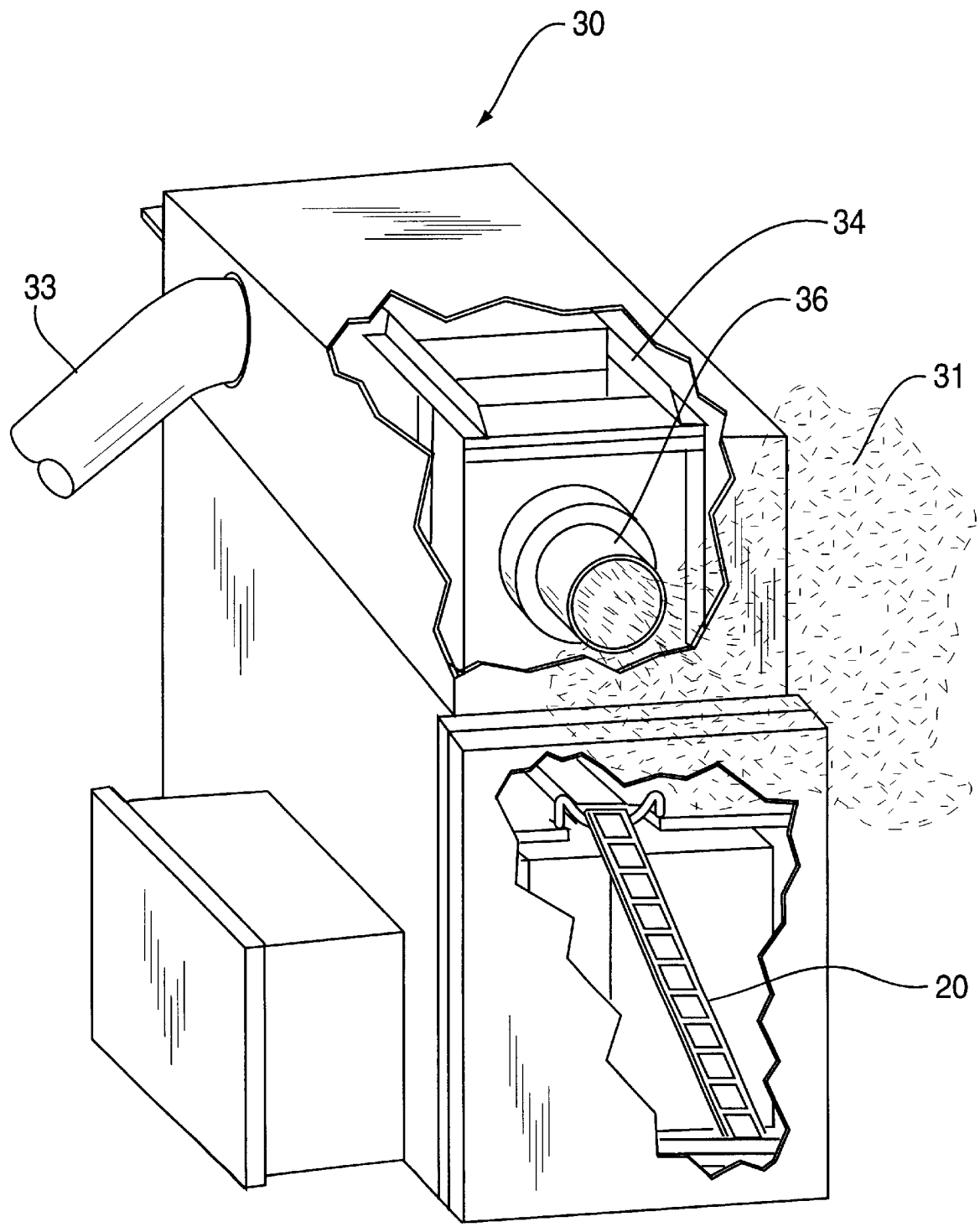
FIG. 2 illustrates a solid particle aerosol dispersal using the device in a dissemination apparatus.

As shown in FIG. 2, the device 20 is inserted into the dissemination apparatus 30 for dispersing the aerosol filler 8 into a solid particle aerosol 31. The dissemination apparatus 30 may be any dissemination apparatus 30 known in the art which is effective to disperse aerosol filler 8 from the device 20. The dissemination apparatus 30 provides a means for the rapid removal of the aerosol filler 8 from the belt 1. The dissemination apparatus 30 preferably comprises a deagglomeration mechanism, or cutting blade section 34. The dissemination apparatus 30 may further comprise a cutting roller mechanism or anvil section which automatically feeds the device 20 into a position to chop the belt 1 along the cell 2 sections. The dissemination apparatus 30 may further include an air supply 33 to disseminate the aerosol filler 8 into a solid particle aerosol 31, said air supply may be supplied from the hot air exhaust of a vehicle. Once cut, the device 20 is disseminated in a solid particle aerosol 31 through a nozzle 36. Preferably, the dissemination apparatus 30 includes such apparatus as the Millimeter Wave Obscurant Cutter, manufactured by Engineering Technology Inc. of Orlando, Fla. or a modified Model 80 Fiber Glass Roving Cartridge Cutter, manufactured by Finn & Fram, Inc. of Pacoima, Calif. which has been adapted to a pneumatic source. The dissemination apparatus 30 may be externally or internally attached to any military or civilian vehicle configured for mounting the dissemination apparatus 30. Preferably, for military applications, the dissemination apparatus 30 is configured for placement on the rear section of a tank such as the M1 Abrams Main Battle Tank.

A process for manufacturing prototype aerosol belt segments was carried out by loading 3 inch wide and 4 millimeter thick zipper tubing, manufactured by U.S. Plastics or Long Branch, N.J., onto spools. After mounting the spools on the top bracket of a heat sealing machine, Pandyno, PD400, the tubing may be feed through a slotted bracket near the top of the machine. Tubing may be fed vertically parallel to the line inscribed on the machine and heat sealed on red heat/maximum cool setting advancing the tubing to the inscribed horizontal line on the machine and sealed again. The process may be continued until the spool is completed, while taking up the sealed belt on the spool located under the machine. The sealed tubing may then be placed on a left side bracket near the heat sealing machine and feed horizontally across the machine, with the bottom of the tubing secured with small c-clamp brackets. After adjusting the machine to white heat/maximum cool setting, the bottom of the tubing may be heat sealed. The tubing may be continued to be feed horizontally while carefully matched up with the bottom heat seal. The bottom portion of tubing may be torn off while a completed 1–5 inch, more preferably 2 inch wide tubing is taken up onto a spool located on the right side of the machine. This would result in the tubing being sealed and sized, without any aerosol filler 8.

Aerosol filler 8 may be prepared by forming a brass slurry mixture. Loose raw brass flakes having a volume of 4000 ml may be placed into 1.5 gallon containers with 250 ml of methanol slowly added to the containers, and stirring with a rod to allow the brass flake to settle. A whisk may be used to thoroughly mix the contents until a caulk-like consistency appears. After any storage time, the contents most likely must, or may, have to be whisked again prior to use. The contents should be used within 4 hours of mixing, as evaporation of the methanol would create a slurry too thick to be properly loaded.

The aerosol filler 8 of brass filler may be loaded into the empty tubing. Heat sealed tubing may be cut into 9 foot sections, with the cut occurring through a cell 2 for ease in splicing the section together in a later step. The zipper seal 6 may be gently opened over the entire length of the tubing, so as not to tear any seals. After centering the tubing sections in wooden racks, the belt may be clamped open at each clip location. A funnel may be used to load the slurry into a bulk load caulk gun, until full. Of course, other solid aerosol particle material such as pesticides or riot control agents may be loaded directly into the individual cells for other product applications.

The caulk gun having a 90 degree hose may be used to insert into the bottom of the cells 2 and pumped until the cells 2 are full. The caulk gun may be preset to fill each cell 2 with a pump. The process may be continued from cell to cell until the caulk gun is empty. The tubing may be sealed forming the device 20 by sealing the entire length of the zipper of the dried slurry loaded belt, being careful not to allow the slurry to contaminate the zipper seal 6, which should be continued until all sections are sealed. Obviously, this process may be automated for large scale production of the belt devices.

After loading, sealing, and drying, the brass loaded belt sections may be placed into a vacuum chamber having a vacuum of 20 in Hg. The belt sections should be left in the vacuum overnight. When the belt sections are removed from the chamber, tape may be used to quickly seal each end to prevent air from reentering the cells 2. Each cell was sealed by making a mechanical connection of the zipper seal. Additional sealing was done by heat sealing the plastic directly above the zipper seal, thereby having a zipper and heat sealed configuration, which ran along the entire belt length.

The belt sections may be joined together by splicing. Belt sections may be aligned with the zipper seals 6 in the same orientation and removing the tape. A notch may be cut below the zipper seal 6 and above the bottom seal on one end in order to insert into another end. Packing tape 1 inch wide and 5 inches long may be placed over the overlap section to cover the tabs and gaps. This may be continued on other sections of belt, until the desired length is formed. The completed belt 1 may then be placed into a box.

In operation, the aerosol filler 8 is dispersed into a solid particle aerosol 31 by feeding the device 20 holding the aerosol filler 8 into the dissemination apparatus 30. The device 20 holding the aerosol filler 8 is shredded within the dissemination apparatus 30, which releases the aerosol filler 8 from the device 20. The shredded device 20 and aerosol filler 8 are disseminated into the atmosphere through nozzle 36. When used in combat, the aerosol filler 8 comprises an IR screening agent which hinders the acquisition radiation from IR weapons and sites. Additionally, when used in agriculture, the aerosol filler 8 comprises an agricultural agent. When used in police actions, the aerosol filler 8 comprises a riot control agent.

EXAMPLE 1

In operation, a belt having individual cells containing an aerosol filler was fed into a dissemination apparatus. The aerosol filler comprised a payload of brass flakes for obscuring IR spectrum radiation. The brass flakes were made in accordance with military specifications EA-B-1341. The belt was fed into the dissemination apparatus, which disseminated the aerosol filler by using rotary cutting equipment and an air supply. The solid particle aerosol device of the present invention creates a minimum IR smoke screen area of 7 meters in height and 50 meters in length from the military vehicle.

EXAMPLE 2

Example 1 was repeated with the exception that the aerosol filler comprised a payload of graphite flakes for obscuring IR spectrum radiation.

It should be understood that the foregoing summary, detailed description, examples and drawings of the invention are not intended to be limiting, but are only exemplary of the inventive features which are defined in the claims.

What is claimed is:

1. An aerosol dissemination device, comprising:

a shreddable belt defined by a length and width;

a plurality of individual cells on said belt, said cells being aligned along the belt length and extending substantially across the belt width, said cells being separated by partitions extending between said cells across the belt width, and said cells further being capable of holding an aerosol filler therein; and, a solid particulate aerosol filler inside said cells, wherein the aerosol filler is selected from the group consisting of an obscurant agent, riot control agent, and agricultural agent.

2. The device of claim 1, wherein said cells form chambers within the structure of said belt.

3. The device of claim 2, further comprising a zipper seal fixed to a side of said belt and extending along the belt length between said cells and an edge of said belt.

4. The device of claim 3, wherein said zipper seal extends approximately an entire belt length.

5. The device of claim 1, wherein said belt is made of material selected from the group consisting of plastics and fabrics.

6. The device of claim 1, wherein said belt is made of polyethylene.

7. The device of claim 6, wherein the cells are from about 1.75 inches to about 3.5 inches in cell length and from about 1.75 inches to about 3.5 inches in cell width.

8. The device of claim 1, wherein said cells form a plurality of rows along the belt length.

9. The device of claim 1, wherein said cells are from about 1 inch to about 5 inches in cell length and from about 1 inch to about 5 inches in cell width.

10. The device of claim 1, wherein the partitions separate the cells from about ⅛ inch to about ½ inch from each other.

11. The device of claim 1, wherein the cells containing the aerosol filler have a thickness of from about ¾ inch or less.

12. The device of claim 1, wherein each cell has approximately equal dimensions.

13. The device of claim 1, wherein the partitions separate the cells an equal distance from each other along the belt length.

14. The device of claim 1, wherein the belt width is from about 1 inch to about 4 inches.

15. An aerosol dissemination device according to claim 1 wherein the solid particulate aerosol filler is an obscurant material selected from the group consisting of titanium dioxide, brass flakes, carbon fibers, graphite flakes and chaff.

16. An aerosol dissemination device according to claim 1 wherein the solid particulate aerosol filler is a riot control material selected from the group consisting of CS, Ortho-chlorobenzalmalononitrile and OC, N-((4-hydroxy-3-methoxyphenyl)methyl)-8-methyl-6-nonenamide.

17. An aerosol dissemination device according to claim 1 wherein the solid particulate aerosol filler is an agricultural agent selected from the group consisting of pesticides, insecticides, fungicides, fertilizer and feed.

18. An aerosol dissemination device, comprising:

a shreddable belt defined by a length and width;

a plurality of individual cells on said belt, said cells being aligned along the belt length and extending substantially across the belt width, said cells being separated by partitions extending between said cells across the belt width, and said cells further being capable of holding an aerosol filler therein; and, a solid particulate aerosol filler inside said cells, wherein the solid particulate aerosol filler is an obscurant material selected from the group consisting of titanium dioxide, brass flakes, carbon flakes, carbon fibers, graphite flakes, and chaff.

19. An aerosol dissemination device, comprising:

a shreddable belt defined by a length and width;

a plurality of individual cells on said belt, said cells being aligned along the belt length and extending substantially across the belt width, said cells being separated by partitions extending between said cells across the belt width, and said cells further being capable of holding an aerosol filler therein; and, a solid particulate aerosol filler inside said cells, wherein the solid particulate aerosol filler is a product selected from the group consisting of riot control agents, pesticides, insecticides, fungicides, fertilizer and feed.

20. The device of claim 19, wherein the belt width is from about 2 inches to about 2.5 inches.

21. An aerosol dissemination device, comprising:

a shreddable belt defined by a length and width;

a plurality of individual cells on said belt, said cells being aligned along the belt length and extending substantially across the belt width, said cells being separated by partitions extending between said cells across the belt width, and said cells further being capable of holding an aerosol filler therein; and, a solid particulate aerosol filler inside said cells, wherein the solid particulate aerosol filler is a riot control agent selected from the group consisting of CS, Ortho-chlorobenzalmalononitrile, and OC, N-((4-hydroxy-3-methoxyphenyl)methyl)-8-methyl-6-nonenamide.

22. A method for disseminating a solid particle aerosol, comprising the steps of:

providing an aerosol dissemination device comprising a shreddable belt defined by a length and width, a plurality of individual cells on the belt, said cells being aligned along the belt length and which extend substantially across the belt width, the cells being separated by partitions extending between the cells across the belt width, the cells further being capable of containing an aerosol filler therein, and, a solid particulate aerosol filler inside the cells;

feeding said device comprising a shreddable belt containing the solid particulate aerosol filler into a dissemination apparatus;

shredding the device containing the solid particulate aerosol filler within the dissemination apparatus; and, disseminating the shredded device and solid particulate aerosol filler into the atmosphere.

23. The method of claim 22, wherein the solid particulate aerosol filler is a product selected from the group consisting of obscurants, riot control agents, pesticides, insecticides, fungicides, fertilizer and feed.

24. The method of claim 23, wherein said obscurant is selected from the group consisting of titanium dioxide, brass flakes, carbon flakes, carbon fibers, graphite flakes, and chaff.

25. An aerosol dissemination device consisting of a shreddable belt comprised of a plurality of packets and a screening material aerosol filler within for processing and dissemination into the open air and by a rotary cutting, pneumatic dissemination apparatus for the creation of an obscurant screening cloud to obscure the visual, infrared or radar signature or visual, infrared, and radar signature.

* * * * *